W. M. GROSVENOR.
HAY DRYING AND THE LIKE.
APPLICATION FILED OCT. 11, 1910.
1,251,510. Patented Jan. 1, 1918.
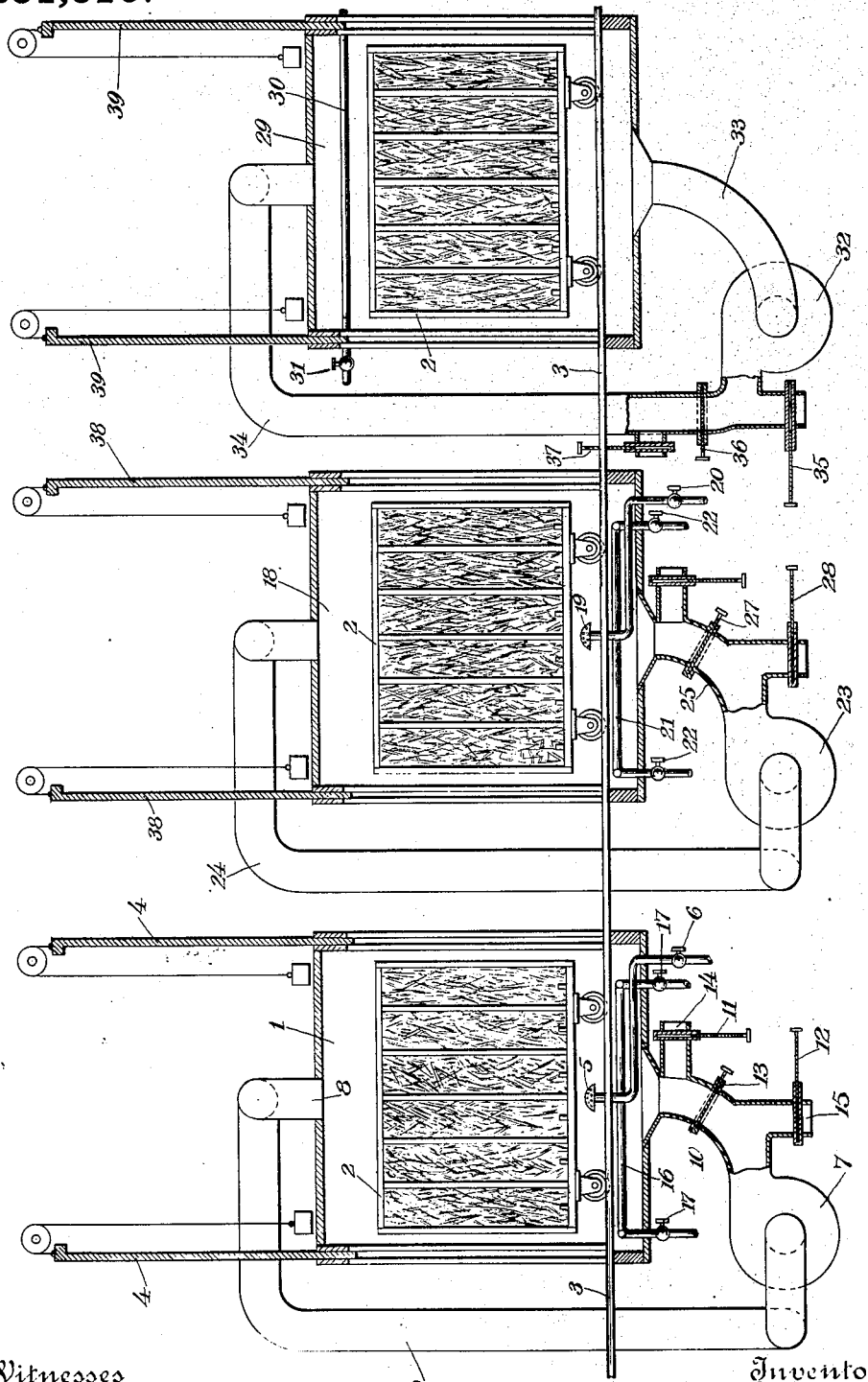

UNITED STATES PATENT OFFICE.

WILLIAM M. GROSVENOR, OF GRANTWOOD, NEW JERSEY.

HAY-DRYING AND THE LIKE.

1,251,510.      Specification of Letters Patent.      Patented Jan. 1, 1918.

Application filed October 11, 1910. Serial No. 586,501.

*To all whom it may concern:*

Be it known that I, WILLIAM M. GROSVENOR, a citizen of the United States, and a resident of Grantwood, in the county of Bergen and State of New Jersey, have invented new and useful Improvements in Hay-Drying and the like, of which the following is a specification.

My invention relates to improvements in processes for curing hay, and one object of my invention is to provide a process which will render obsolete the slow and cumbersome methods of curing and drying hay and by which hay may be quickly and more conveniently cured and dried, and by which the hay will be of much better quality, more properly cured and dried and this without the interference of variable weather conditions.

Hitherto it has been the custom to expose the hay to the action of sun and air in the field where cut, until certain chemical changes in the hay are partially completed and until the greater portion of its moisture is removed by air and sun drying, turning it occasionally to expose the concealed under portions more fully to sun and air and finally completing the drying and curing by prolonged storage in barns or ricks where it would be exposed to the air and protected from the weather. During the first stages of treatment, however, it has of necessity been subjected to climatic changes, the first stages of the curing have been dependent on weather conditions and much loss of material, time and labor, has been incurred. During this preliminary treatment which generally lasts several days, a chemical alteration of the hay takes place, as well as the physical removal of free moisture. It is believed that there are changes in the ratio of soluble proteids to insoluble proteids and soluble cellulose to insoluble cellulose. Also changes in the hydration of the cellulose molecules, and a sort of partial fermentation has been supposed to take place. In the meantime, a bleaching or browning action occurs supposed to be accompanied by more or less complete conversion of the chlorophyl. In producing the better qualities of hay for the open market the bleaching is reduced to a minimum by shortening the preliminary treatment as much as possible and leaving a larger portion of the curing to take place in the barn. The risk incurred in doing this is that when stored in bulk, the moisture remaining in the hay will cause too active a fermentation, produce heating and possibly combustion.

In my improved process, the hay is first submitted for a time to a high temperature without removing a large percentage of its moisture. In other words it is steamed or subjected to a hot humid atmosphere in order to promote the rapid conversion of proteids and hydration of cellulose. In order to prevent the bleaching or browning action this treatment is carried out in the absence of strong light and it is found that there is little alteration of color. I believe the conversion of the chlorophyl is thus practically eliminated. The period of this exposure may be considerably varied but I have found that in order to produce satisfactory hay it should not be less than one minute and preferably between five and eight minutes. The extent to which chemical alteration takes place will of course be dependent on the period allowed, but in order to secure good keeping qualities the period should not be too much shortened and the moisture in the atmosphere should preferably exceed 14 grains per cubic foot.

It has been found that hay dries much more rapidly and evenly if such a period for distribution of moisture is allowed prior to the effort to dry the hay. Moisture which remains in the stem is more difficult to remove. The distribution period, therefore, which serves to permit the withdrawal of moisture from the stem to the leaves preferably aided by high temperature to reduce the viscosity of the fluids, greatly increases the rapidity of drying and the completeness with which drying can be quickly executed. The rapidity of the distribution of the moisture is largely dependent on temperature and it is therefore found an advantage to submit the hay to an elevated temperature without great evaporation so that this distribution of the moisture may take place before the hay tubes become too dry and contract. For this purpose, I preferably submit the hay to air or a suitable medium having a temperature exceeding 120° F. preferably in excess of 180° F., and a humidity of about 80%.

In the second stage of my process as preferably carried out, the hay is submitted to a somewhat drier atmosphere but it is not found necessary to use dry air because the preliminary removal of moisture may be quite satisfactorily carried out at a high humidity provided an elevated temperature is used and by so doing steaming is not so soon discontinued. It is therefore deemed desirable to prolong the steaming period as much as possible in the sense that a certain amount of steaming and drying can be carried on simultaneously. For this purpose, I preferably submit the hay to air or other medium at a temperature of about 180° F. and a humidity of about 60%.

In the third stage as preferably carried out of my process, it is necessary to complete the removal of moisture so that not more than 12% shall remain in the hay and in this stage of the process the hay is submitted at an elevated temperature say about 150° F., to the action of a drying medium such as warm gases, or at a higher temperature to superheated steam, for the purpose of removing the moisture. Preferably all three of these treatments or the entire treatment as it is progressively manipulated, are carried out in the absence of strong light in order to reduce as much as possible the conversion of the chlorophyl. More facility in the manipulation of the process will enable me to carry out the entire drying in an atmosphere of steam or superheated steam containing little or no air, and to control the evaporation by the degree of superheat.

In carrying out my process, I may use the form of drier described by me in application filed September 25, 1909, Serial No. 519595 in which the tentering mechanism would of course be replaced by conveyers, and the conditioning may also be omitted. Also the ingress and egress openings might of course be larger and other openings similarly located may also be provided and fans used to accelerate the circulation returning upon itself as was indicated in that application. Or I may use the form of curing apparatus shown in the accompanying drawings, which show in longitudinal sectional elevation one form of apparatus in which the process may be carried out and in which 1 represents a chamber in which the first step of my process is carried out. The hay is placed in ricks 2, running on rails 3, and the rick with hay is run into the chamber 1. Both inlet and exit doors 4 are then closed, and steam is admitted to the chamber through a nozzle 5. The amount of steam admitted is controlled by a stop cock 6. Circulation of the gaseous medium in the chamber 1 may be produced by means of a fan blower at 7 drawing the medium out of the top of the chamber at 8 and through the conduit 9 and forcing the medium in again through the conduit 10. By opening the gates 11 and 12 and closing the gate 13 fresh air may be admitted at 14 and the old drying medium expelled at 15. Heating pipes 16 may be utilized to bring the temperature within the chamber 1 to the proper degree and the temperature may be controlled by the stop cock 17. By controlling the cocks 6 and 17 and the gates 11, 12 and 13, the hay is subjected to the humid medium composed of steam and air, as above described, until the first step of my process is carried out as above described.

The rick of hay is then run into the second chamber provided with a similar steam nozzle 19 and its regulating stop cock 20, and with heating pipes 21 and their stop cocks 22. A fan at 23 is also provided for this chamber which fan draws the drying or curing medium out of the top of the chamber through the duct and forces it in at the bottom through a duct 25. Similar gates at 26, 27 and 28 are also provided for regulating the entrance of the outside air to the chamber and the exit of the curing medium. In this chamber 18, the humidity and temperature are properly regulated and the second step of my process carried out as above described.

In the third chamber, 29, I have omitted the steam nozzle, although superheated steam may be used in the chamber as suggested. The heating pipes in this chamber 29 are arranged at 30 above the rick of hay 2 with a regulating stop cock at 31. The heating pipes, etc., may be arranged in either manner in any or all of the chambers. The fan 32 in this case draws the drying medium from the bottom of the chamber through the duct 33 and forces it into the top of the chamber through the duct 34. Gates 35, 36 and 37 are also provided for regulating the entrance of outside air and the exit of drying medium. After the second stage of the process is completed, the hay is run into the chamber 29, where the final drying or third stage of my process is carried out, as above described, the heating coils 30 being regulated to give the proper temperature and the gates 35, 36 and 37 being regulated to properly dispose of the drying medium which has become laden with moisture. During the various stages of the process the doors 4, 4, 38, 38, 39 and 39 are kept closed so that all the steps may be carried out in substantial darkness.

In some cases all three steps of my process may be carried out in the first chamber 1, in which case, after the first step has been carried out therein, the amount of steam, temperature, or both, and the gates may be adjusted to carry out the second step as above described. After carrying out the second step the steam may be shut off or superheated steam admitted or formed therein, and the temperature and gates adjusted to carry out the third step. Or by merely allowing the escape of air and excess steam from a single chamber, as chamber 1, through the valve 15, and continued application of suitably adjusted heat with the coil 16, it is possible to carry out the entire process in an atmosphere of more or less superheated steam, except just at the start. Other forms of apparatus can be used if desired.

In this manner it has been found practical to cure alfalfa in approximately thirty minutes. Alfalfa cured in this manner has been found to possess from 10 to 20% higher nutritive valve than the field cured hay. Also it shows a brilliant green color and a complete absence of brown or bleached portions and of streaked appearance owing to irregular exposure to light, which is declared to increase the value of the product about $2.00 per ton. Also operating in this manner with a small installation it has been found that two men are able to do all the labor of curing and baling hay at the rate of about one ton an hour. Another advantage presented is that the hay after being subjected to this treatment may be immediately baled or otherwise packaged to partially exclude the moisture of the air, whereupon it keeps better and will not sour or ferment in the bales, so that large barn capacity for the final curing of the hay and the risk of deterioration or fire is eliminated. Finally, the curing and drying is made entirely independent of weather conditions and it has been found possible to cut, cure and bale hay while it was actually raining, the whole operation from the standing grass to the baled hay requiring less than an hour's time.

Having thus fully and clearly described my improvements, what I claim as new and desire to secure by Letters Patent, is:

1. The process of curing and drying hay or the like which consists in submitting the substantially fresh cut grass to a moist atmosphere heated to a temperature in excess of 120 deg. F. for a period in order to secure the distribution of moisture to the leaves, then drying the hay.

2. The process of curing grass for hay which consists in cooking it for a time at an elevated temperature and humidity in the absence of strong light and then drying it.

3. The process of curing hay or the like which consists in first steaming the hay, then steaming and drying the hay and finally drying the hay so that not more than 15% of free moisture remains therein.

4. The process of curing hay or the like which consists in subjecting it to the action of steam and air at a high temperature, then subjecting it to the action of drying medium accompanied by a smaller quantity of steam and finally subjecting it while still hot to the action of a drying medium alone and until substantially dry.

5. The process of curing hay or the like which consists in steam cooking the grass, simultaneously steam cooking and drying the grass and finally drying the hay.

6. The process of curing hay or the like which consists in first steaming the hay, then steaming and drying the hay, excluding strong light substantially during said portions of the process and finally drying the hay so that not more than 15% of free moisture remains therein.

7. The process of curing hay or the like which consists in subjecting it to the action of steam and air at a high temperature in the absence of strong light, then subjecting it to the action of air accompanied by a smaller quantity of steam and finally subjecting it while still hot to the action of a drying medium until substantially dry.

8. The process of curing hay or the like which consists in steam cooking the grass in the absence of strong light, simultaneously steam cooking and drying the grass and finally drying the hay.

9. The process of curing hay, or the like, which consists in subjecting it to the action of steam and air at a high temperature, then subjecting it to the action of air accompanied by a smaller quantity of steam, and finally subjecting it, while still hot, to the action of a drying medium until substantially dry and, during the first stages of the curing, excluding strong light therefrom.

10. The process of curing hay or the like which consists in steam cooking the grass, then simultaneously steam cooking and drying the grass and finally drying the hay, excluding strong light substantially during the first stage of the curing.

11. The process of curing hay or the like which consists in first steaming the hay, then drying the hay so that not more than 15% of free moisture remains therein and thereupon compressing the hay into bales.

12. The process of curing hay or the like which consists in subjecting it to the action of steam and air at a high temperature, then subjecting it to the action of a drying medium accompanied by a smaller quantity of steam, subjecting it while still hot to the action of air until substantially dry and thereupon compressing the hay into bales.

13. The process of curing hay or the like which consists in steam cooking the grass, then simultaneously steam cooking and drying the grass, drying the hay and thereupon compressing the hay into bales.

14. The process of curing hay or the like in which the material is subjected to the action of superheated steam to cure and dry the hay.

In testimony whereof, I have signed my name to this specification, in the presence of two subscribing witnesses.

WILLIAM M. GROSVENOR.

Witnesses:
GORHAM CROSBY,
EDWIN SEGER.